(12) United States Patent
Leitch et al.

(10) Patent No.: US 8,197,893 B2
(45) Date of Patent: Jun. 12, 2012

(54) COLORED METAL FLAKE SURFACED ROOFING MATERIALS

(75) Inventors: Olan T. Leitch, Bakersfield, CA (US); John G. Freshwater, Frisco, TX (US); Matti Kiik, Richardson, TX (US)

(73) Assignee: Building Materials Investment Corporation, Dallas, TX (US)

( * ) Notice: Subject to any disclaimer, the term of this patent is extended or adjusted under 35 U.S.C. 154(b) by 852 days.

(21) Appl. No.: 12/234,339

(22) Filed: Sep. 19, 2008

(65) Prior Publication Data

US 2009/0117329 A1 May 7, 2009

Related U.S. Application Data

(63) Continuation-in-part of application No. 10/274,717, filed on Oct. 21, 2002, now abandoned, which is a continuation-in-part of application No. 10/210,501, filed on Aug. 1, 2002, now Pat. No. 6,585,813, which is a continuation of application No. 09/590,222, filed on Jun. 8, 2000, now abandoned.

(51) Int. Cl.
   *B05D 1/12* (2006.01)
   *B05D 5/06* (2006.01)
(52) U.S. Cl. .................. 427/188; 427/186; 427/218
(58) Field of Classification Search .................. 427/186, 427/188, 218
   See application file for complete search history.

(56) References Cited

U.S. PATENT DOCUMENTS

| | | | |
|---|---|---|---|
| 1,427,755 A | 10/1918 | Harris | |
| 2,133,988 A | 10/1938 | Harshberger | |
| 2,332,219 A | 10/1946 | Harshberger | |
| 2,981,636 A * | 4/1961 | Lodge et al. | 428/404 |
| 3,033,700 A | 5/1962 | Buckman et al. | |
| 3,197,313 A | 7/1965 | Griener | |
| 3,484,267 A | 12/1969 | Sadler | |
| 3,494,727 A | 2/1970 | Rapaport | |
| 3,836,417 A | 9/1974 | Yaeger | |
| 3,884,706 A | 5/1975 | Little | |
| 3,886,021 A | 5/1975 | Breckenfelder | |
| 3,888,176 A | 6/1975 | Horai, Jr. et al. | |
| 3,888,682 A | 6/1975 | Nelson | |
| 3,888,683 A | 6/1975 | Horai, Jr. et al. | |
| 3,894,877 A | 7/1975 | Nelson | |
| 3,932,143 A | 1/1976 | Marshall et al. | |

(Continued)

FOREIGN PATENT DOCUMENTS

EP       0616015       9/1994

(Continued)

OTHER PUBLICATIONS

U.S. Appl. No. 10/274,717, Jun. 22, 2009 Notice of Abandonment.

(Continued)

*Primary Examiner* — Frederick Parker

(74) *Attorney, Agent, or Firm* — Baker Botts LLP

(57) ABSTRACT

The present invention relates to roofing materials for roofs, sidewalls and other exterior surfaces exposed to the weather such as, but not limited to, asphaltic and non-asphaltic roofing materials, wherein color coated metal flakes cover up to 100% of the weathering surface of the roofing materials. The metal flakes are coated with a colored coating material by fluidizing the flakes in an air stream, spraying pressurized air and colored coating material, and curing the coated metal flakes. The present invention also relates to methods of making roofing materials.

17 Claims, 5 Drawing Sheets

U.S. PATENT DOCUMENTS

| | | | |
|---|---|---|---|
| 4,082,885 | A | 4/1978 | Rashid et al. |
| 4,092,441 | A | 5/1978 | Meyer et al. |
| 4,193,898 | A | 3/1980 | Miller |
| 4,298,543 | A | 11/1981 | Law et al. |
| 4,386,981 | A | 6/1983 | Clapperton |
| 4,396,665 | A | 8/1983 | Rowe |
| 4,405,680 | A | 9/1983 | Hansen |
| 4,468,430 | A | 8/1984 | Ruede |
| 4,521,333 | A | 6/1985 | Graham et al. |
| 4,565,716 | A | 1/1986 | Williams et al. |
| 4,617,198 | A * | 10/1986 | Overturf ................ 427/186 |
| 4,745,032 | A | 5/1988 | Morrison |
| 4,784,897 | A | 11/1988 | Brands et al. |
| 5,261,955 | A | 11/1993 | Nadkarni |
| 5,305,569 | A | 4/1994 | Malmquis et al. |
| 5,356,664 | A | 10/1994 | Narayan et al. |
| 5,382,475 | A | 1/1995 | Kayser |
| 5,391,417 | A | 2/1995 | Pike |
| 5,427,793 | A | 6/1995 | Bigham et al. |
| D369,421 | S | 4/1996 | Kiik et al. |
| 5,565,239 | A | 10/1996 | Pike |
| 5,573,810 | A | 11/1996 | Grubka |
| 5,599,586 | A | 2/1997 | Israel |
| 5,666,776 | A | 9/1997 | Weaver et al. |
| 5,743,985 | A | 4/1998 | Ernest et al. |
| 5,965,257 | A | 10/1999 | Ahluwalia |
| 6,037,019 | A | 3/2000 | Kooyer et al. |
| 6,156,289 | A | 12/2000 | Chopra et al. |
| 6,176,920 | B1 | 1/2001 | Murphy et al. |
| 6,214,466 | B1 | 4/2001 | Joedicke |
| 6,245,381 | B1 | 6/2001 | Israel |
| 6,289,648 | B1 | 9/2001 | Freshwater et al. |
| 6,585,813 | B2 | 7/2003 | Kiik et al. |
| 2007/0148342 | A1 * | 6/2007 | Kalkanoglu et al. .......... 427/212 |
| 2009/0291260 | A1 | 11/2009 | Kiik et al. |

FOREIGN PATENT DOCUMENTS

| | | |
|---|---|---|
| JP | 61053371 | 3/1986 |
| WO | WO92/07037 | 4/1992 |

OTHER PUBLICATIONS

U.S. Appl. No. 10/274,717, Mar. 30, 2009 Decision on Appeal.
U.S. Appl. No. 10/274,717, Feb. 2, 2009 Confirmation of Hearing by Appellant.
U.S. Appl. No. 10/274,717, Jan. 16, 2009 Notification of Appeal Hearing.
U.S. Appl. No. 10/274,717, Nov. 10, 2008 Appeal Docketing Notice.
U.S. Appl. No. 09/590,222 (Abandoned), filed Jun. 8, 2000.
U.S. Appl. No. 10/274,717 (Abandoned), filed Oct. 21, 2002.
U.S. Appl. No. 10/274,717, Jun. 2, 2008 Reply Brief Filed and Request for Oral Hearing.
U.S. Appl. No. 10/274,717, Apr. 1, 2008 Examiner's Answer to Appeal Brief.
U.S. Appl. No. 10/274,717, Dec. 21, 2007 Appeal Brief Filed.
U.S. Appl. No. 10/274,717, Aug. 23, 2007 Notice of Appeal Filed.
U.S. Appl. No. 10/274,717, May 25, 2007 Final Office Action.
U.S. Appl. No. 10/274,717, Mar. 8, 2007 Response to Non-Final Office Action.
U.S. Appl. No. 10/274,717, Oct. 5, 2006 Non-Final Office Action.
U.S. Appl. No. 10/274,717, Jul. 21, 2006 Amendment and Request for Continued Examination (RCE).
U.S. Appl. No. 10/274,717, Jan. 26, 2006 Final Office Action.
U.S. Appl. No. 10/274,717, Nov. 4, 2005 Response to Non-Final Office Action.
U.S. Appl. No. 10/274,717, May 3, 2005 Non-Final Office Action.
U.S. Appl. No. 10/274,717, Oct. 20, 2004 Response to Non-Final Office Action.
U.S. Appl. No. 10/274,717, May 18, 2004 Non-Final Office Action.
U.S. Appl. No. 10/274,717, Feb. 6, 2004 Response to Non-Final Office Action.
U.S. Appl. No. 10/274,717, Sep. 3, 2003 Non-Final Office Action.
U.S. Appl. No. 10/210,501, May 15, 2003 Issue Fee payment.
U.S. Appl. No. 10/210,501, Feb. 24, 2003 Notice of Allowance.
U.S. Appl. No. 10/210,501, Feb. 14, 2003 Response to Non-Final Office Action.
U.S. Appl. No. 10/210,501, Nov. 15, 2002 Non-Final Office Action.
U.S. Appl. No. 12/471,866, Mar. 10, 2011 Amendment and Request for Continued Examination (RCE).
U.S. Appl. No. 12/471,866, Sep. 16, 2010 Final Office Action.
U.S. Appl. No. 12/471,866, Jun. 29, 2010 Response to Non-Final Office Action.
U.S. Appl. No. 12/471,866, Dec. 29, 2009 Non-Final Office Action.
"Study of Algal Discoloration of Asphalt Roofing Shingles" 3M Industrial Mineral Products Division, St. Paul, Minnesota, Dec. 1987.
Popovic, Sandor, Concrete Material: Properties, Specification and Testing, 1992 Noyes Publications, pp. 375,294.
"Aluminum Success Story: new Reflective Aluminum Chips Save Energy and Extend Roof Life" Office of Industrial Technologies, Energy and Renewable Energy, U.S. Department of Energy, http://www.eere.energy.gov/inventions/pdfs/transmet.pdf.
U.S. Appl. No. 12/471,866, Feb. 16, 2012 Non-Final Office Action.

* cited by examiner

US 8,197,893 B2

COLORED METAL FLAKE SURFACED ROOFING MATERIALS

CROSS REFERENCE TO RELATED APPLICATIONS

This application is a continuation-in-part of U.S. patent application Ser. No. 10/274,717, filed on Oct. 21, 2002, now abandoned which is a continuation-in-part of U.S. patent application Ser. No. 10/210,501, filed on Aug. 1, 2002, now U.S. Pat. No. 6,585,813 which is a continuation of U.S. patent application Ser. No. 09/590,222, filed on Jun. 8, 2000, now abandoned, each of which is hereby incorporated by reference in its entirety.

FIELD OF INVENTION

The present invention relates to metal flake-surfaced roofing materials which may be used for roofs and also for sidewalls and other exterior surfaces exposed to the weather. Particularly, the present invention relates to colored metal flake surfaced roofing materials, such as disclosed in U.S. patent application Ser. No. 10/274,717, published as U.S. Pat. Pub. No. 2003-0091795 A1, the contents of which are hereby incorporated by reference in their entirety.

The roofing materials which may be surfaced with metal flakes include, but are not limited to, asphaltic roofing materials and non-asphaltic roofing materials such as concrete, plastic, rubber or metal roofing materials that have other materials on the exposed surface to provide a weathering surface or which are used for aesthetic purposes.

The present invention further relates to methods of making the colored metal flake-surfaced roofing materials. Metal flakes may be coated with a colored coating material, and may be applied to the surface of roofing materials as the sole surfacing material or in combination with conventional colored roofing granules. Any roofing material that uses colored roofing granules, crushed natural stone, or coatings on the exposed roofing surface can have metal flakes applied thereto, in place of or in addition to the roofing granules, crushed natural stone, or coatings, in accordance with the present invention.

BACKGROUND OF THE INVENTION

Roofing materials, such as roofing shingles, are made from a wide variety of materials, including metal, slate, concrete, plastic, asphalt, etc.

The advantages of metal roofs are that they are aesthetically pleasing, durable, long lasting, lightweight, ecologically sound, fire retardant, and energy efficient. The disadvantages of metal roofs are that they are expensive, require installation by a professional trained in metal roofing installation, and can be damaged or dented by outdoor elements, such as hail. Tegola (Pasiano, Italy) manufactures a copper foil shingle which is an asphalt strip shingle that has a copper foil over the exposed portion of the shingle. The copper foil-asphalt strip shingle is easier to install than conventional metal shingles.

Slate roofs have the advantages of long life, fire resistance, high strength, relatively low maintenance, and an aesthetically distinctive appearance. Slate roofs, however, are heavy and expensive. Further, slate exists in limited color choices, can be easily damaged (particularly during maintenance due to walking on the roof), and relies on underlayment which usually fails before the slate.

Asphalt roofing materials have the advantages of good performance in extreme temperatures and areas where wind, water and ice are of concern. In addition, asphalt roofing materials offer enhanced efficiency in that they can be produced in high volume and can be easily installed, resulting in lower costs and improved overall value. Furthermore, asphalt roofs can be made with colored asphalt to produce a colored roofing surface tailored to desired color, reflectance, and emittance. However, many asphalt roofing materials do not have the same aesthetic qualities as metal and slate roofs and most do not have the equivalent life span. Additionally, colored asphalt roofing materials can be very expensive.

Pigment-coated mineral rocks are commonly used as color granules in roofing applications to increase the aesthetic and protective functions of asphalt shingles. Roofing granules typically are made of crushed and screened mineral materials that, subsequent to crushing and screening, can be coated with a binder containing one or more coloring pigments such as suitable metal oxides. The binder can be a soluble alkaline silicate that is subsequently insolubilized by heat or by chemical reaction, resulting in an insoluble colored coating on the mineral particles. Preparation of colored, coated roofing granules is disclosed for example, in U.S. Pat. No. 2,981,636 of Lodge et al. The granules are then employed to provide a protective layer on asphaltic roofing materials such as shingles.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One such environmental stress is the elevated temperature experienced by roofing shingles under sunny, summer conditions, especially roofing shingles coated with dark colored roofing granules.

Asphalt shingles coated with conventional roofing granules are known to have low solar heat reflectance, and hence will absorb solar heat especially through the near infrared range (700 nm-2500 nm) of the solar spectrum. This heat absorption characteristic is increased as the granules covering the surface become darker in color. For example, white colored asphalt shingles can have solar reflectance in the range of 25-35%, whereas dark colored asphalt shingles may have solar reflectance of only 5-15%. There is a continuing need for roofing materials that exhibit excellent reflectance, as well as emittance, characteristics while being aesthetically pleasing. It has been proposed to replace asphalt shingles with shingles coated in metal flakes. However, such shingles, while reflective, generally do not have satisfactory emittance characteristics and may not be considered aesthetically pleasing for certain applications.

U.S. Pat. No. 2,133,988 describes a method of increasing shingle durability by using very fine aluminum flakes on the shingle surface between the larger mineral surfacing rock to block ultraviolet degradation of the asphalt coating and to lower the temperature of the shingle, thereby promoting asphalt stability and preventing blistering. U.S. Pat. No. 2,332,219 describes mixing the aluminum flakes with other materials to reduce dust, increase asphalt compatibility for reflowing the aluminum to the surface, and aid in adhering the aluminum flakes. The aluminum flakes may be used as the sole shingle covering or may be blended with mineral surfacing. The aluminum flakes may be adhered to other mineral rock granules and aluminum dross may be used as a granule or surface granule in whole or in part. The size of the flakes ranges between 150 and 350 mesh.

U.S. Pat. No. 4,617,198 discloses a metal chip application equipment for low slope applications. A water bath is used to cool a modified cap sheet and the chips are projected or flung onto the sheet. Chip materials include aluminum, magnesium and tin. The chips are rectangular chips having a size ranging from 10 to 200 mils on a side, preferably 60 to 80 mils on a side, by 1 to 2 mils thick. The patent also discloses that chips having a larger size than 200 mils on a side are not suitable due to their inability to withstand wind gusts when the cap sheet having the metal chips is applied on a roof.

Accordingly, there exists a need for a roofing material with improved durability and aesthetic qualities. There is also a need for a roofing material which has an appearance of a metal or slate shingle but which can be colored to have desired reflectance and emittance levels.

SUMMARY OF THE INVENTION

According to one aspect of the present invention, a colored metal flake surfaced roofing material is produced by providing a plurality of metal flakes, fluidizing the metal flakes in an air stream, spraying a first colored coating material in the air stream to coat the metal flakes, curing the coated metal flakes, and applying the coated metal flakes to a base roofing material to produce a colored metal flake surfaced roofing material. In accordance with an aspect of the present invention, the coated metal flakes have a final weight at least twenty percent greater than the initial weight of the metal flakes. The fluidizing of the metal flakes in an air stream can include preconditioning the metal flakes by fluidizing them in a stream of pressurized air prior to spraying a coating material. The metal flakes can be selected from copper flakes, tin flakes, zinc flakes, aluminum flakes, steel flakes, stainless steel flakes, bronze flakes, and combinations thereof. In accordance with one aspect of the present invention, the metal flakes are of a size greater than the size of flakes passing through a U.S. Standard Sieve #50. Spraying the coating material includes spraying a first colored coating material with high pressure air that can be pressurized at 30 to 120 psi. The colored coating material can be a water-based paint or a silicate. The colored coating material can be a mixture of a silicate and water and such a mixture can be between about 40 and 60 percent silicate. The fluidizing of metal flakes in an air stream and spraying of colored coating material can continue for a period of 15 to 45 minutes. Curing of the coated metal flakes can include heat curing or chemical curing. Heat curing of the coated metal flakes can be carried out at between about 800 and 1000 degrees F. The method of the present invention can include spraying a second colored coating material to create an outer coating on the metal flakes. The metal flakes can be coated with a first colored coating material and a second coating material that is darker than the first colored coating material. The steps of fluidizing the metal flakes and spraying a colored coating material can be carried out at between about 250 and 500 degrees F. The surface of the metal flakes can be roughened prior to spraying a first colored coating material.

BRIEF DESCRIPTION OF THE DRAWINGS

The present invention may be better understood with reference to the attached drawings in which.

While the invention is capable of various modifications and alternative forms, specific embodiments thereof have been shown by way FIGS. 1-6, and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

The present invention is directed to colored flake surfaced roofing materials and methods of making such roofing materials.

Figure 1:
FIG. 1 shows an exemplary embodiment of a metal flake surfaced roofing shingle according to the present invention, where nearly the entire weathering surface of the shingle has been covered with colored metal flakes.

As shown in FIG. 1, a roofing shingle produced in accordance with an aspect of the present invention includes colored metal flakes covering substantially all of the weathering surface of the shingle.

Figure 3:
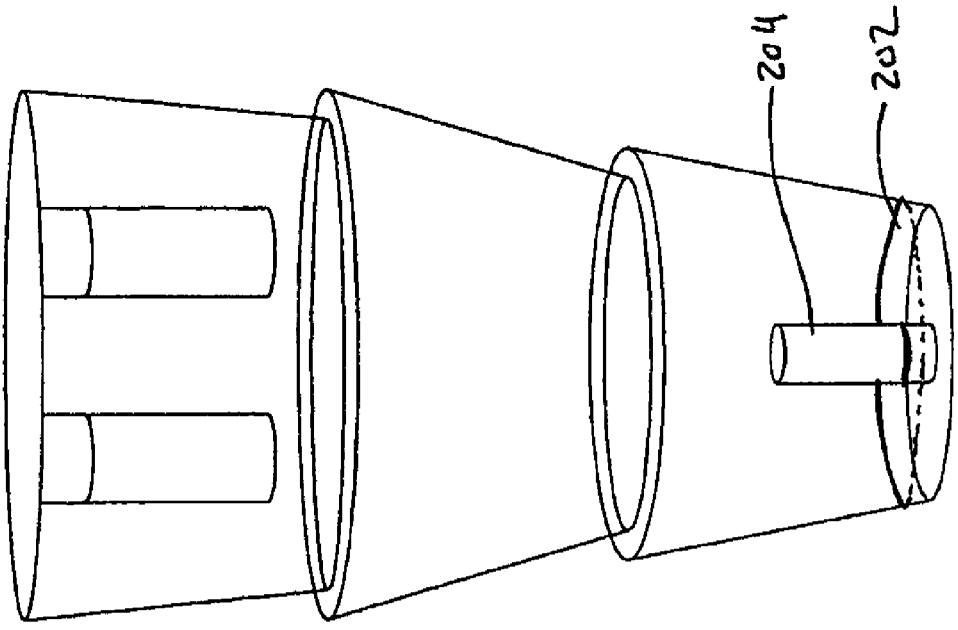
FIG. 3 shows a cross sectional side view of a coating device according to the present invention.
Figure 2:
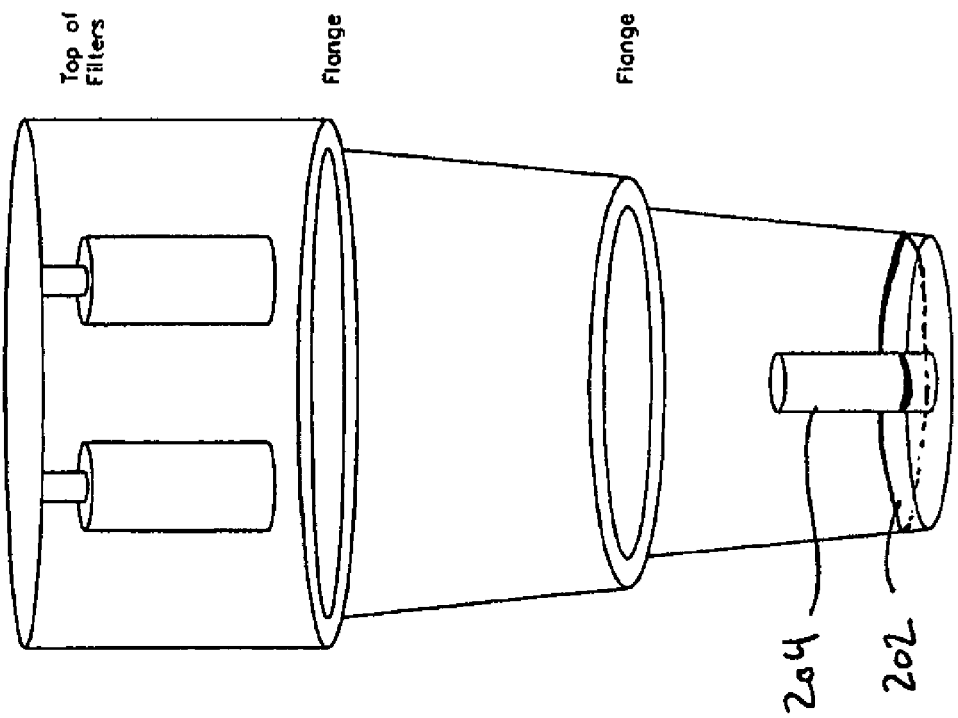
FIG. 2 shows a cross sectional side view of a coating device according to the present invention.

In order to prepare the metal flakes for application to a base roofing material, metal flakes are provided to a coating machine. Two exemplary coating machines are shown in FIGS. 2 and 3. A coating machine in accordance with the present invention is typically generally cylindrical in shape and tall, with a diameter to height ratio of approximately 1 to 5 or more.

Figure 5:
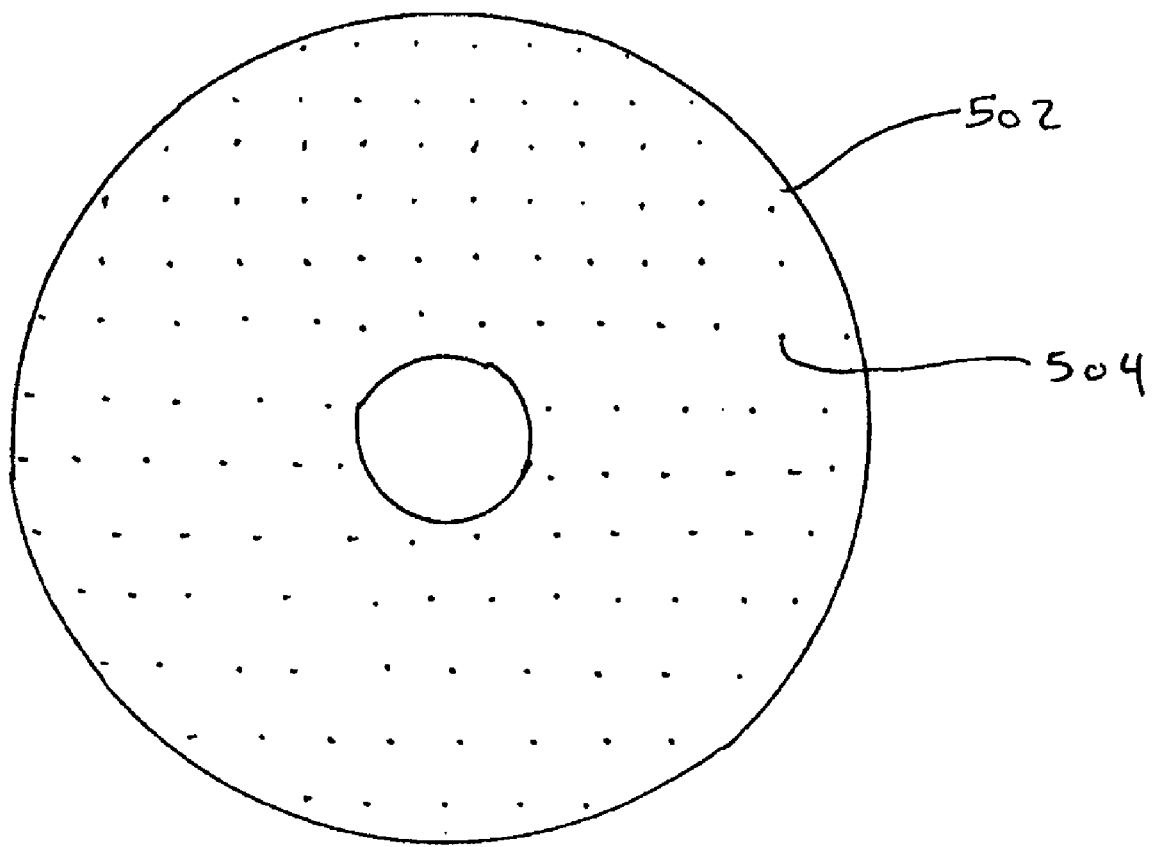
FIG. 5 shows a top view of a flat metal plate with fluidizing air holes according to the present invention.
Figure 6:
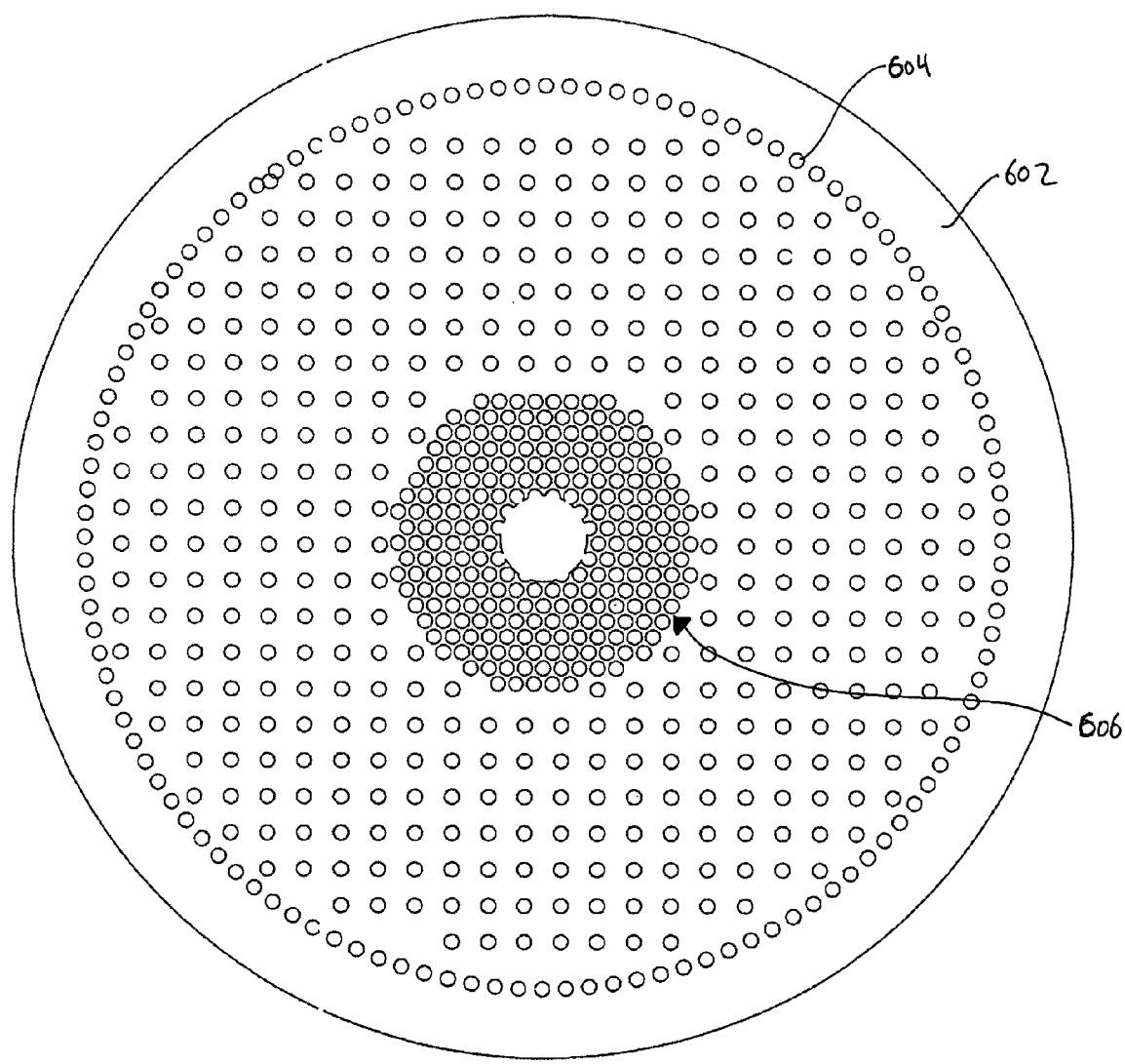
FIG. 6 shows a top view of an alternate flat metal plate with fluidizing air holes according to the present invention.

Metal flakes are placed into the coating machine as dry bulk material. In order to coat substantially all of the surface of the metal flakes and keep the flakes from agglomerating during the coating process, the coating machine of the present invention is configured to fluidize the metal flakes in an air stream within the coating machine prior to applying the colored coating. The coating machine is closed and a stream of pressurized air is started within the coating machine. The pressurized air is distributed using a flat metal plate 202 with specifically placed and sized holes. An exemplary metal plate 502 is shown in FIG. 5 having holes 504 placed in rows across the surface of the plate. The holes 504 can be placed in any pattern desired to control the fluidizing air flow. Additionally, the holes can be any size desired. The stream of pressurized air causes the bulk metal flakes to fluidize within the stream and flow as a group of individual flakes. The air flow in the stream can be optimized by controlling flow rates, pressure, temperature, humidity, and location. The air location can be controlled by the flat metal plate, which can be a diffuser plate in the bottom of the coating machine. For example, as shown in FIG. 6, an exemplary diffuser plate 602 includes holes 604 generally in evenly spaced rows about the surface of the plate 602. Diffuser plate 602 includes a dense section of holes 606 in the center of the plate.

The fluidized metal flakes flow within the coating machine and can create a fluidized bed of flakes that can be upwards of 300% of the volume of the bed of flakes prior to fluidizing the flakes in an air stream. The majority of flakes stay within the fluidized bed during the entire coating cycle. It is contemplated that the fluidized bed can be increased to virtually any size accommodated by the coating apparatus. Preferably, the fluidized bed has a volume of approximately 300% of the original volume of the bed of flakes.

The coating machine includes at least one paint spray nozzle 204 as shown in FIGS. 2 and 3. Once the metal flakes are fluidized to create a fluidized bed in the coating machine, the paint spray nozzle 204, located at the bottom of the coating machine and pointing upward, is fed with dry high pressure compressed air. The compressed air is in the range of 30 to 120 psi and causes the fluidized flakes in its path to be picked up and shot toward the top of the coating machine in a narrow column. Once this has begun, typically after sufficient time to allow the bed of flakes to expand and create a fluidized bed, liquid coating material is added to the stream of compressed air. In operation, the liquid coating material can be added to the stream of compressed air as soon as the air flow has begun. The coating material is pumped into the nozzle with adjustable pressure and flow characteristics which allows for variable loading of the coating onto the metal flakes. It is preferable to completely coat the surface of the metal flakes with a thin and even coating.

The spray coating process typically runs for a cycle of 15 to 45 minutes or until the metal flakes are coated. Once this process is complete, the paint spray nozzle 204 or nozzles and the fluidizing air stream are shut off. The coated flake is removed from the coating machine and the coating machine is then ready for a new batch of dry bulk metal flakes.

The colored coating material can be selected from a broad range of paints and silicates to suit a particular application. Water based paints can be used as can silicates and mixtures of silicate and water. Preferably, the viscosity of the colored coating material is less than 300 centipoises. Colored coating materials can be used "off the shelf" as provided by a supplier, for example, or can be thinned to tailor the viscosity of the colored coating material to allow for thinner coatings or faster drying coating. Such colored coating materials can include approximately 50% solids, with approximately 10% of the solids being pigment and the rest being additives or other fillers.

The coating process is complete when the metal flakes are completely coated or have the desired look, which can depend upon the target application. Once the coating process is complete, the coated metal flakes are cured either by heat curing or chemical curing in order to dry and solidify the colored coating.

Additionally, the coating process can include first coating a layer of light undercoat colored coating material, and then coating a second layer of dark colored coating material to create an outer coating. The dual coating provides for better reflectivity and color variation control. When performing dual coating, a curing step between coats is optional. Preferably, dual coating is accomplished without a cure step in between. Dual-coated flakes, having a first layer of light undercoat and a second layer of dark colored coating material, exhibit improved reflectance and emittance. Additionally, dual coated flakes can provide improved properties at a lower cost than flakes coated with a single layer, due to the fact that a thinner top coat can be used.

Upon completion of the coating and curing process, the colored metal flakes are applied to a base roofing material in order to substantially cover the weathering surface of the roofing material. Using colored metal flakes as a weathering surface covering provides previously-unknown advantages over colored mineral granules. While the high-reflectance characteristics of metal flakes has been recognized in the prior art, it was not previously appreciated that coloring the flakes provides desirable increased emittance. Moreover, although coloring the flake may diminish the flake's reflectance, the flake still generally provides for a higher reflectivity than color-coated granules due to the flat shape of the flake and base metal reflectance. Colored metal flake surfaced roofing materials in accordance with the present invention can therefore more readily meet or exceed desired thresholds for reflectance and emittance, such as the minimum California Code of Regulations Title 24 requirements of reflectance of 20% and an emittance of 75%. The roofing materials can be in various forms including, for example, roofing shingles, roofing tiles, roll roofing, commercial cap sheets, modified bitumen cap sheets, shakes and sidewalls.

As used herein, the term "weathering surface" does not include the headlap of the roofing shingle. Accordingly the metal flakes are applied so as to cover the entire area or substantially the entire area of the weathering surface, while the headlap of the roofing shingle remains substantially free of metal flakes.

The metal flakes can be applied to the roofing materials by any method known in the art. For example, the metal flakes can be applied in a similar manner as roofing granules are applied to an asphaltic roofing shingle, i.e., the metal flakes may be applied to an asphaltic shingle during the asphalt shingle making process while the asphalt is still hot. In addition, the metal flakes can be heated and then applied to a surface of an asphaltic roofing material in order to adhere the metal flakes to the surface of the roofing material. Alternatively, the metal flakes can be applied to the surface of a roofing material and then heated to ensure that the metal flakes are adhered to the surface of the roofing material. The metal flakes are preferably applied to the weathering surface so that the metal flakes do not substantially overlap when the roofing material of the present invention is applied to a roof.

Some coated metal shingles use an acrylic coating to adhere colored roofing granules to the metal. This process may be used in accordance with the present invention to apply metal flakes to any roofing material.

Flex Shake™ (US Century, Calif.) is a roofing product made from used tires (recycled steel reinforced rubber). An adhesive coating is applied to the surface of the rubber for the application of slate chips or colored roofing granules. In accordance with the present invention, metal flakes may be correspondingly applied to the surface of the rubber using an adhesive coating.

The metal flakes may be of any metal. Nonlimiting examples include copper, tin, zinc, aluminum, brass, bronze, steel, stainless steel, lead, or any other desired metal. The metal flakes may be made from recycled metal to lower the cost of the roofing material. Moreover, the metal flakes due to the colored coating process of the present invention can be tailored to achieve any desired aesthetic appearance, such as an appearance of any metal or stone. In one embodiment the metal flakes are of a size greater than the size of flakes passing through a U.S. Standard Sieve #50.

The metal flakes may be interspersed with conventional roofing granules (e.g., colored roofing granules) to provide unique aesthetic appearances. For example, the interspersement of metal flakes and roofing granules may produce the appearance of bands or striations to achieve aesthetic characteristics, such as to enhance the ability of the resultant shingle to provide a perception of depth to the roof.

In another embodiment of the present invention, asphaltic roofing materials are covered with metal flakes and standard roofing granules in approximately equal amounts.

In addition, the roofing material of the present invention may be non-asphaltic, such as, but not limited to, cement tile and composite imitation slate, and is surfaced with metal flakes to produce the colored metal flake-surfaced roofing materials of the present invention.

The roofing material may be a bitumen cap sheet and the metal flakes may be applied onto the bitumen cap by laying the flakes flat on the sheet.

The metal flake-surfaced roofing materials of the present invention provide a durable and aesthetically pleasing roofing material and have an improved life compared to conventional roofing materials. Thus, utilization of the materials of the present invention affords many of the benefits of slate roofs without the added weight and cost and complexity of installation. Metal flakes may be less than half the thickness of the same metal used in conventional metal shingles. For example, copper shingles can measure 0.025" in thickness and metal flakes can average 0.007" in thickness.

Additionally, the metal flake-surfaced roofing materials of the present invention may provide architectural qualities, e.g., a roof surfaced with them does not look flat but rather has a three-dimensional architectural look. Furthermore, architectural qualities may be imparted to the metal flake-surfaced roofing materials by applying the metal flakes in striations or bands which are separated by conventional roofing granules, such as ceramic roofing granules, or by blending the metal flakes with roofing granules. The interspersement and/or blending of the metal flakes and roofing granules allow the roofing materials of the present invention to impart to a roof a more three-dimensional appearance. In addition, different metal flakes (e.g., tin and copper/steel and bronze) may be blended together to achieve unique aesthetic appearances and may also be blended with roofing granules.

In one embodiment of the present invention, the metal flakes are of similar size to conventional roofing granules. In such an embodiment, the process of applying coated metal flakes to a roofing material may be similar to the process of applying conventional roofing granules to a roofing material. In contrast, known metal roofing processes involve sheet or coil metal and the shingles are formed by stamping, bending or punching which is cumbersome. In addition, known metal roofing processes require special shingle cutting equipment.

An exemplary silicate coating material is a potassium silicate in liquid form used to coat metal flakes, for example aluminum flakes. Curing of the silicate is accomplished by slowly increasing temperature to 200-210 degrees F. to remove excess water and then increased to 300-400 degrees F. for final curing. A single, ultra thin coat of the silicate that is completely dehydrated will provide a permanent coating that is highly impermeable to moisture and weathering. Preferably, the coat is kept as thin as possible while fully covering the metal surface of the flake.

With respect to roofing shingles, certain colors may be preferred for aesthetic purposes and additionally for functional purposes to do with reflectance and emittance. If desired, finished shingles can be made to meet or exceed the minimum Title 24 requirements of reflectance of 20% and emittance of 75%.

In order to obtain metal flakes of controlled color, the present invention provides methods for coating metal flakes with a colored coating material, as discussed above. In these trials a colored coating material of paint mixed with deionized water was used. The viscosity, application rate, and drying time were optimized using a 70/30 ratio of paint to water. Weight gain was calculated based upon the total weight of the metal flakes added into the fluidized bed, the solids weight of the paint added, and a 95% paint usage effectiveness. Following coating, for brown coatings there was about 5% of flake that had exposed aluminum. This was primarily due to the layout of the coating machine shown in FIG. 2 because flakes landed on internal ledges causing uneven coating. An alternate coating machine is shown in FIG. 3 that eliminates internal edges and allows for more even coating. The results of testing of the color coated metal flakes is shown below and graphically represented in FIG. 4 depicting the change in reflectance and emittance with increased weight gain by paint coating.

Figure 4:
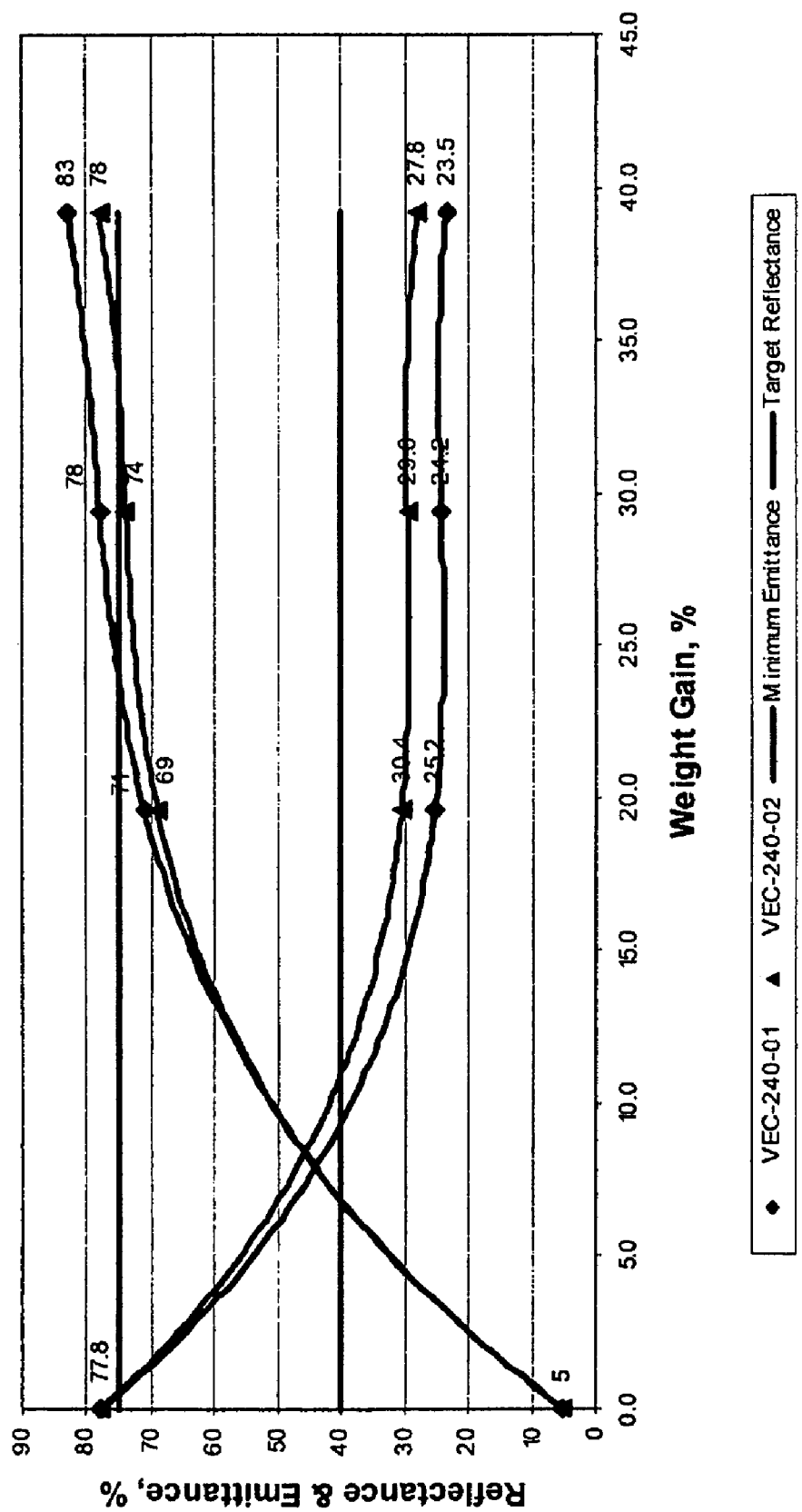
FIG. 4 shows a table depicting testing data for examples prepared according to the present invention.

As seen in FIG. 4, emittance of the coated metal flakes is dependent upon coating thickness, which is measured in this case as percent weight gain. However, reflectance of the coated metal flakes is independent of coating thickness. Reflectance is dependent rather on pigment loading. In order to meet the reflectance target independently of adjusting coating thickness and therefore emittance, the amount of pigment loaded in the coating can be optimized.

| | Weight Gain % | Reflectance % | R Target % | Emittance % | E Minimum % |
|---|---|---|---|---|---|
| VEC-240-02 Brown Pigmented Silicate Coated Aluminum Flake | | | | | |
| Control | 0 | 77.8 | 40 | 5 | 75 |
| Sample 1 | 19.6 | 30.4 | 40 | 69 | 75 |
| Sample 2 | 29.4 | 29.6 | 40 | 74 | 75 |
| Sample 3 | 39.2 | 27.8 | 40 | 78 | 75 |
| #801 Al Brown (49% Solids) | | | | | |
| Sample 4 | 20 | 25.7 | 40 | 71 | 75 |
| Sample 5 | 25 | 27.1 | 40 | 72 | 75 |
| Sample 6 | 30 | 26.5 | 40 | 76 | 75 |
| #720 Al White (51% Solids) | | | | | |
| Sample 7 | 20 | 34.5 | 75 | 79 | 75 |
| Sample 8 | 25 | 39.1 | 75 | 79 | 75 |
| Sample 9 | 30 | 37.7 | 75 | 83 | 75 |

During trials, 100% coated flake was produced of both brown coated aluminum flake (#801) and white coated aluminum flake (#720). This was achieved by preconditioning the flakes in the coater by fluidizing the flakes in a fluidized bed and turning on the paint spray applicators to 85 psi prior to applying the paint. The preconditioning period lasted for from 1 to 10 minutes. The colored coating material was diluted to a 60:40 ratio of pigment to water and the coating was applied to a 30% weight gain.

Metal flake batches were coated in a processing period of approximately 30-45 minutes. Adjustments can be made to equipment settings and dilution levels of the colored coating material in order to adjust processing time. In particular, the water content of the coating, the temperature of the coater, the air flow speed, paint flow, and paint nozzle pressure, can all be adjusted in order to obtain a desired coating profile. It is preferred that the colored coated metal flakes have a final weight of at least 20% greater than their initial weight. Preferably, the colored coated metal flakes have a weight gain of between about 20% and 30% greater than their initial weight. It was determined that emittance increased as a function of weight gain of the flakes, and 20-30% weight gain provided a preferable gain in emittance relative to the additional cost of the coating material.

In these trials, deionized water was used. The viscosity, application rate, and drying time were optimized to a 70/30 ratio of colored coating material to water. Weight gain is calculated based on the total weight of the flake added into the fluidized bed, the solids weight of the paint added, and a 95% paint usage effectiveness.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A method of producing a colored-flake coated roofing material comprising:
    providing a plurality of metal flakes;
    roughening a surface of the plurality of metal flakes;
    fluidizing the plurality of metal flakes in an air stream;
    spraying a first liquid colored-coating material in the air stream to coat the plurality of metal flakes to produce coated metal flakes;
    curing the coated metal flakes; and
    applying the coated metal flakes to a base roofing material to produce a colored-flake coated roofing material.

2. The method of claim 1, further comprising the plurality of metal flakes having an initial weight, and the coated metal flakes having a final weight at least 20% greater than the initial weight.

3. The method of claim 1, wherein fluidizing the plurality of metal flakes in a stream comprises preconditioning the plurality of metal flakes by fluidizing the plurality of metal flakes in a stream of pressurized air prior to spraying a coating material.

4. The method of claim 1, wherein the plurality of metal flakes are selected from the group consisting of copper flakes, tin flakes, zinc flakes, aluminum flakes, steel flakes, stainless steel flakes, bronze flakes, and combinations thereof.

5. The method of claim 1, wherein the plurality of metal flakes are of a size greater than the size of flakes passing through a U.S. Standard Sieve #50.

6. The method of claim 1, wherein the compressed air is pressurized at 30 to 120 psi.

7. The method of claim 1, wherein the first colored-coating material is a water based paint.

8. The method of claim 1, wherein the first colored-coating material is a mixture of silicate and water.

9. The method of claim 8, wherein the mixture is between about 40 and 60 percent silicate.

10. The method of claim 1, wherein the fluidizing and spraying steps continue for 15 to 45 minutes.

11. The method of claim 1, wherein curing the coated metal flakes comprises heat curing.

12. The method of claim 11, wherein the heat curing is carried out at between about 800 and 1000 degrees F.

13. The method of claim 1, wherein curing the coated metal flakes comprises chemically curing.

14. The method of claim 1, further comprising spraying a second coating material to create an outer coating on the plurality of metal flakes.

15. The method of claim 14 wherein the second coating material is darker than the first colored-coating material.

16. The method of claim 1, wherein the fluidizing and spraying steps are carried out at between 250 and 500 degrees F.

17. A method of producing a colored-flake coated roofing material comprising:
    providing a plurality of metal flakes;
    fluidizing the plurality of metal flakes in an air stream;
    spraying a first liquid colored-coating material in the air stream to coat the plurality of metal flakes to produce coated metal flakes, wherein the colored-coating material is a water based paint;
    curing the coated metal flakes; and
    applying the coated metal flakes to a base roofing material to produce a colored-flake coated roofing material.

* * * * *